United States Patent [19]

Doggett et al.

[11] 3,772,142
[45] Nov. 13, 1973

[54] N-SULFOHYDROCARBON-SUBSTITUTED ACRYLAMIDE POLYMERS AS FORMATION AIDS FOR NON-WOVEN STOCK

[75] Inventors: Roger H. Doggett, Natick; Richard P. Tschirch, Westwood, both of Mass.

[73] Assignee: The Lubrizol Corporation, Wickliffe, Ohio

[22] Filed: Mar. 23, 1971

[21] Appl. No.: 127,384

[52] U.S. Cl............ 162/168, 162/164, 252/355, 260/174 CL
[51] Int. Cl............................. D21h 3/58
[58] Field of Search............ 162/168, 164; 260/17.4 CL, 29.6 SQ, 79.3 M, 79.3 MU; 252/355

[56] References Cited
UNITED STATES PATENTS

| | | | |
|---|---|---|---|
| 3,692,673 | 9/1972 | Hoke | 210/52 |
| 2,761,834 | 9/1956 | Sven et al. | 162/168 X |
| 3,637,564 | 1/1972 | Economou | 260/29.6 SQ |
| 3,255,138 | 6/1966 | Kruckenberg et al. | 260/79.3 MU |
| 3,547,899 | 12/1970 | Arlt et al. | 260/79.3 MU |
| 3,222,245 | 12/1965 | Paschmann | 162/168 |
| 3,336,270 | 8/1967 | Monagle | 260/79.3 MU |
| 3,350,338 | 10/1967 | Savage | 260/79.3 MU |
| 3,201,304 | 8/1965 | Munjat | 162/168 |

FOREIGN PATENTS OR APPLICATIONS

| | | | |
|---|---|---|---|
| 704,778 | 1965 | Canada | 260/79.3 M |
| 1,182,954 | 3/1970 | Great Britain | 260/79.3 M |
| 656,311 | 1963 | Canada | 260/79.3 M |
| 696,872 | 1964 | Canada | 260/79.3 MU |

*Primary Examiner*—S. Leon Bashore
*Assistant Examiner*—Frederick Frei
*Attorney*—Roger Y. K. Hsu, William H. Pittman, James W. Adams, Jr. and James V. Tura

[57] ABSTRACT

Polymers of N-sulfohydrocarbon-substituted acrylamides, especially the alkali metal salts of 2-acrylamido-2-methylpropanesulfonic acid, are useful as fiber dispersants in the preparation of paper and similar stock.

9 Claims, No Drawings

N-SULFOHYDROCARBON-SUBSTITUTED ACRYLAMIDE POLYMERS AS FORMATION AIDS FOR NON-WOVEN STOCK

This invention relates to an improved method for producing non-woven stock, and to compositions for use in said method. More particularly, it is directed to an improvement in a method which comprises forming a sheet from an aqueous slurry of a plurality of fibers, said improvement comprising adding to said slurry, as a formation aid, at least one polymer containing units of the formula

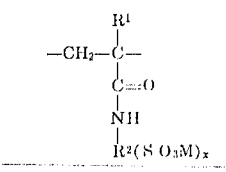

wherein $R^1$ is hydrogen or a lower alkyl or substituted lower alkyl radical; $R^2$ is a divalent or trivalent hydrocarbon or substituted hydrocarbon radical; M is hydrogen or one equivalent of a cation; and $x$ is 1 or 2.

In the formation of paper and non-woven fabrics from natural and synthetic fibers, an aqueous slurry of the fibers is customarily deposited on a continuously moving mesh or perforated surface such as a hollow cylinder or Fourdrinier wire, and the water is removed from said slurry. Typically, drainage and suction are used to decrease the water content of the slurry to about 80 percent, after which rolls and presses assisted by evaporation are used to remove the remaining water and form a dry sheet.

In the preparation, handling and forming of long fiber slurries, there is a tendency for the fibers in the aqueous slurry to become entangled or agglomerated, impairing the uniformity of the final sheet. To avoid this problem, a dispersant is often added to the slurry keep the fibers separated. Few substances are known which serve as adequate dispersants for this purpose; one of the few is deacetylated karaya gum, which, however, is rather expensive and, as a naturally derived product, is subject to fluctuation in supply and quality. More recently, synthetic polymers have been discovered which have some of the properties of deacetylated karaya gum, but these polymers are even more expensive than the natural product. It is therefore of interest to develop new chemical compositions which serve to disperse long fibers in the preparation of paper and similar non-woven stock.

A principal object of the present invention, therefore, is to provide suitable dispersants for use as formation aids in the preparation of non-woven stock from long fibers.

A further object is to provide an improved method for the preparation of non-woven stock, including paper.

Still another object is to provide an improved aqueous fiber slurry which can be converted to paper or similar stock by removal of water.

Other objects will in part be obvious and will in part appear hereinafter.

In brief, the method described herein involves the use as fiber dispersants of water-soluble polymers of N-sulfohydrocarbon-substituted acrylamides. These polymers are repre-sented by the above formula in which $R^1$ is hydrogen or a lower (as defined hereinafter) alkyl radical and $R^2$ is a divalent or trivalent hydrocarbon radical. As used herein, the term "hydrocarbon radical" includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cyclic hydrocarbon radical.

The following are illustrative of divalent hydrocarbon radicals within the scope of this invention. Where a named radical has several isomeric forms (e.g., butylene) all such forms are included.

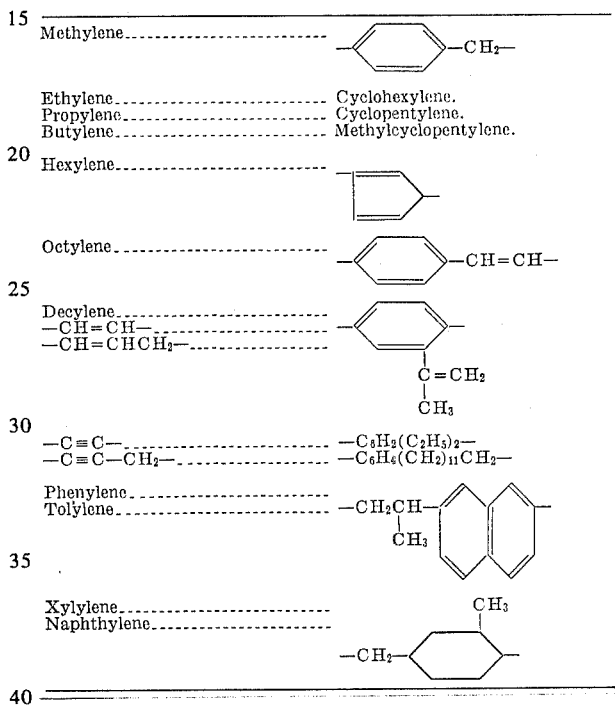

Trivalent radicals are similar to the above but have an additional hydrogen atom abstracted.

Many obvious variations of these radicals will be apparent to those skilled in the art and are included within the scope of the invention.

Substituted hydrocarbon, alkyl, aryl, alkylene, arylene, etc., radicals are considered fully equivalent to the hydrocarbon, alkyl, aryl, alkylene, arylene, etc., radicals and to be part of this invention. By "substituted" is meant radicals containing substituents which do not alter significantly the character or reactivity of the radical. Examples are:

Halide (fluoride, chloride, bromide, iodide)
Hydroxy
Ether (especially lower alkoxy)
Keto
Carboxy
Ester (especially lower carbalkoxy)
Aminoacyl (amide)
Amino
Nitro
Cyano
Thioether
Sulfoxy
Sulfone
Sulfonic acid ester, amide, etc.

In general, no more than about three such substituent groups will be present for each 10 carbon atoms in the radical.

Preferably, the hydrocarbon or substituted hydrocarbon radicals in the polymers used in the method of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkylene or arylene radicals, most often alkylene.

In the formula, M is hydrogen or one equivalent of a cation and is usually hydrogen or (preferably) alkali metal. $R^1$ is hydrogen or lower alkyl but is preferably hydrogen or methyl, usually hydrogen. $R^2$ may be any divalent or trivalent hydrocarbon radical, preferably lower alkylene or arylene and usually lower alkylene. In a preferred embodiment of this invention, $R^2$ is

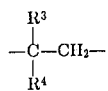

wherein $R^3$ is hydrogen or a lower alkyl radical, $R^4$ is a lower alkyl radical and the sulfonic acid group is attached to the unsubstituted methylene carbon. These polymers may be obtained by the polymerization, either alone or in combination with other polymerizable vinyl monomers, of the corresponding monomeric N-sulfohydrocarbon-substituted acrylamides of which the following acids, and their salts, are examples.

2-Acrylamidoethanesulfonic acid $$CH_2=CHCONHCH_2CH_2SO_3H$$

2-Acrylamidopropanesulfonic acid

2-Acrylamido-2-methylpropanesulfonic acid

3-Methacrylamidopropanesulfonic acid

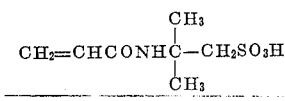

4-Methacrylamidocyclohexanesulfonic acid

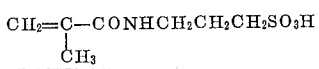

2-Acrylamido-2-phenylethanesulfonic acid

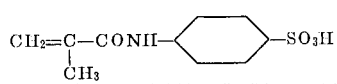

2-Acrylamido-2-phenylpropanesulfonic acid

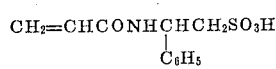

4-Acrylamidobenzenesulfonic acid

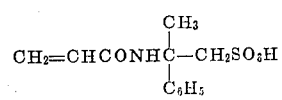

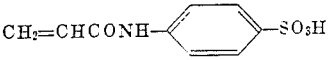

5-Acrylamidobenzene-1,3-disulfonic acid

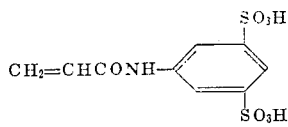

From the standpoint of economy, ease of preparation and polymerization, and effectiveness, the most desirable dispersants are polymers of salts of 2-acrylamido-2-methylpropanesulfonic acid, usually alkali metal salts and preferably sodium or potassium salts. The term "N-sulfohydrocarbon-substituted acrylamide" when used hereinafter will refer to this class of compounds generally, with the understanding that the above-named compound is especially preferred.

The N-sulfohydrocarbon-substituted acrylamide polymers used in the method of this invention may be homopolymers or copolymers, the latter containing at least about 5 percent by weight, and preferably at least about 50 percent, of N-sulfohydrocarbon-substituted acrylamide units. The identity of the other monomer or monomers is not critical except that the polymer must be water-soluble. The most useful polymers are homopolymers and copolymers with 5–95 percent, preferably 5–50 percent and most desirably 5–30 percent, of an acrylic monomer such as acrylic or methacrylic acid or a salt or amide thereof, notably acrylamide (which may be partially hydrolyzed), methacrylamide, N-methylacrylamide, diacetone acrylamide and the like.

The polymers may be prepared in bulk, solution, suspension or emulsion. Since they must be water-soluble, it is frequently convenient to prepare them in aqueous solution. Another method, which has been found particularly useful, is to prepare an aqueous solution of the monomer or monomers and suspend the same, prior to polymerization, in a water-immiscible solvent such as an aliphatic or aromatic hydrocarbon or halogenated hydrocarbon. Generally, the sulfonic acid monomer is converted to its metal salt prior to polymerization by means of a suitable alkaline reagent. When polymerization is effected in suspension, ordinary suspending agents known to those skilled in the art are used.

The polymerization may be promoted by typical initiators used in aqueous systems, especially peroxides, persulfates, persulfate-bisulfite and the like. It has been found that the alkali metal salts, especially the sodium salt, of 2-acrylamido-2-methylpropanesulfonic acid may frequently be polymerized in the absence of polymerization initiator.

It is sometimes advantageous to carry out the polymerization in the presence of a small amount of chain transfer agent, which tends to cause formation of a polymer with more uniformity in molecular weight than is otherwise produced. Suitable chain transfer agents are known to those skilled in the art.

The fibers used in the method of this invention may be synthetic or natural fibers. Natural fibers include, for example, hemp, cotton, wood pulp and reclaimed waste paper. Typical synthetic fibers include rayon, polyamide, polyester and polyolefins. Depending on the type of stock being prepared, these fibers may be admixed with various non-fibrous materials.

The amount of N-sulfohydrocarbon-substituted polymer used in the method of this invention is generally about 0.1–10 percent by weight, based on the weight of fibrous material in the slurry. About 1–5 percent is preferred.

The utility of the N-sulfohydrocarbon-substituted acrylamide polymers in the method of this invention is illustrated by a test in which several polymers are added to aqueous slurries of stock material. In stock A, the solids consist of 50 percent 1/4-inch, 1.5-denier rayon and 50 percent beaten bleached kraft pulp; in stock B, the solids consist of hemp fiber. Paper-type sheets having a basis weight of 40 lbs. per 3,000 sq. ft. are then prepared from the stock material on a Williams handsheet mold by conventional methods, and the uniformity of the sheet is evaluated with a Thwing-Albert Formation Tester. The following polymers are tested:

1. A homopolymer of sodium 2-acrylamido-2-methyl propanesulfonate, prepared by suspending a concentrated aqueous solution of the monomer in benzene and polymerizing in the presence of an ammonium persulfate-sodium bisulfite catalyst and sodium lauryl sulfate as a suspending agent. The polymer has an inherent viscosity of 5.89, measured as an 0.5 percent solution in 3 percent aqueous sodium chloride solution at 30° C.

2. A copolymer of sodium 2-acrylamido-2-methylpropanesulfonate and acrylic acid in an 85:15 weight ratio, prepared in aqueous solution using an ammonium persulfate-sodium bisulfite initiator. It has an inherent viscosity, measured as for polymer (1), of 3.72.

3. A copolymer of sodium 2-acrylamido-2-methylpropanesulfonate and acrylamide in a 50:50 weight ratio, prepared as described for polymer (1) and having an inherent viscosity of 4.93.

4. A homopolymer of sodium 2-acrylamido-2-methylpropanesulfonate, prepared in benzene suspension using an ammonium persulfate-sodium bisulfite initiator and a sodium dodecylphenolsulfonate suspending agent. The inherent viscosity of the product is 8.58, measured as above on an 0.25 percent polymer solution.

The results of this test are given in the following table. Polymer percentage is based on the weight of solids in the slurry. Uniformity of the sheets increases with increasing formation value.

| Polymer | Polymer percentgae | Stock | Formation value |
|---|---|---|---|
| Control | — | A | 100 |
| 1 | 2 | A | 108 |
| 1 | 5 | A | 130 |
| 2 | 2 | A | 114 |
| 2 | 5 | A | 135 |
| 3 | 2 | A | 123 |
| 3 | 5 | A | 123 |
| 4 | 0.5 | A | 136 |
| 4 | 1 | A | 137 |
| 4 | 2 | A | 172 |
| 4 | 0.5 | B | 144 |
| 4 | 1 | B | 185 |
| 4 | 2 | B | 171 |

What is claimed is:

1. An aqueous slurry comprising a plurality of fibers and, as a dispersant therefor, at least one water-soluble polymer containing at least five percent by weight of units of the formula

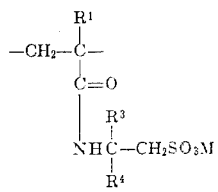

wherein $R^1$ is hydrogen, a lower alkyl radical, or a substituted lower alkyl radical in which the substituents do not alter significantly the character or reactivity of said radical; $R^3$ is hydrogen or a lower alkyl radical; $R^4$ is a lower alkyl radical; and M is hydrogen or one equivalent of a cation; the amount of said water-soluble polymer being about 0.1–10 percent by weight based on the weight of said fibers.

2. A slurry according to claim 1 wherein the fibers are adapted for the formation of non-woven stock therefrom.

3. A slurry according to claim 2 wherein $R^1$ is hydrogen or methyl.

4. A slurry according to claim 3 wherein the water-soluble polymer is a homopolymer of an alkali metal 2-acrylamido-2-methylpropanesulfonate, or a copolymer thereof with acrylic acid.

5. A slurry according to claim 4 wherein the water-soluble polymer is a homopolymer.

6. In a method for producing non-woven stock which comprises forming a sheet from an aqueous slurry of a plurality of fibers, the improvement which comprises adding to said slurry, as a dispersant for said fibers, about 0.1–10 percent by weight, based on the weight of said fibers, of at least one water-soluble polymer containing at least five percent by weight of units of the formula

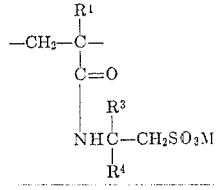

wherein $R^1$ is hydrogen, a lower alkyl radical, or a substituted lower alkyl radical in which the substituents do not alter significantly the charcacter or reactivity of said radical; $R^3$ is hydrogen or a lower alkyl radical; $R^4$ is a lower alkyl radical; and M is hydrogen or one equivalent of a cation.

7. A method according to claim 6 wherein $R^1$ is hydrogen or methyl.

8. A method according to claim 7 wherein the water-soluble polymer is a homopolymer of an alkali metal 2-acrylamido-2-methylpropanesulfonate, or a copolymer thereof with acrylic acid.

9. A method according to claim 8 wherein the water-soluble polymer is a homopolymer.

* * * * *